US008954450B2

(12) United States Patent
Trahan et al.

(10) Patent No.: US 8,954,450 B2
(45) Date of Patent: Feb. 10, 2015

(54) SYSTEM FOR MANAGING WEB-BASED CONTENT DATA CHRONOLOGICALLY

(76) Inventors: Chris Trahan, San Jose, CA (US); Ryan Trahan, San Jose, CA (US); David Olszewski, Campbell, CA (US)

(*) Notice: Subject to any disclaimer, the term of this patent is extended or adjusted under 35 U.S.C. 154(b) by 131 days.

(21) Appl. No.: 13/507,212

(22) Filed: Jun. 14, 2012

(65) Prior Publication Data
US 2013/0339361 A1    Dec. 19, 2013

(51) Int. Cl.
*G06F 17/30* (2006.01)

(52) U.S. Cl.
USPC .......................................................... 707/748

(58) Field of Classification Search
None
See application file for complete search history.

(56) References Cited

U.S. PATENT DOCUMENTS

| | | | |
|---|---|---|---|
| 2007/0024722 A1* | 2/2007 | Eura et al. | 348/231.2 |
| 2008/0034039 A1* | 2/2008 | Cisler et al. | 709/204 |
| 2008/0040665 A1* | 2/2008 | Waldeck | 715/277 |
| 2013/0046785 A1* | 2/2013 | Assadollahi | 707/776 |

* cited by examiner

*Primary Examiner* — Wilson Lee
(74) *Attorney, Agent, or Firm* — James A. Gavney, Jr.; JAG Patent Services

(57) ABSTRACT

The present invention is directed to a computer implemented system for organizing electronic content data chronologically. In operation, application software, that is preferably hosted on a remote server, organizes the electronic communications data. The electronic communications data is transmitted from multiple sources or users associated with relationship identities or identifiers. The application software organizes the electronic communications data chronologically onto interactive and displayable time-lines. The application software also preferably organizes the electronic communications data into user accessible sub-files along the time-lines based on dates of transmission. The application software runs electronic communications applications, such as e-mail or social network applications, directly or alternatively interfaces with external electronic communications applications to generate the time-lines.

12 Claims, 3 Drawing Sheets

SYSTEM FOR MANAGING WEB-BASED CONTENT DATA CHRONOLOGICALLY

FIELD OF THE INVENTION

This invention relates to computer systems for managing web-based content data in a cloud-based computing environment. More particularly, the present invention relates to computer systems for managing web-based content data in a cloud-based computing environment chronologically.

BACKGROUND OF THE INVENTION

Cloud-based computing provides computation, software, data access, and storage services that do not require a user to have knowledge of the physical location and configuration of the system and architecture that delivers the content data and/or services. Cloud-based computing can include the delivery of any kind of content data and/or services in real-time, which extend the capabilities to a remote computing device, typically over the interne.

There are a number of computer systems that manage web-based content data chronologically. For example, e-mail servers and host computer e-mail programs allow users to organize e-mails according to the date or time that the e-mail communications are transmitted, the subject threads of the e-mail communications, the file sizes of the e-mail communications and the originators of the e-mail communications.

In the U.S. Pat. No. 7,725,492, to Sittig et al., a system is disclosed that allow users to organize relationships in a social network via a social time line. Sittig et al. describe a system, whereby data with calendar dates are received between multiple user's. The data is then organized in chronological order and photos are coupled to the data corresponding the multiple users, thereby generating a social time-line.

In U.S. Pat. No. 7,802,007 to Reese, a methods and apparatus for facilitating consumption of services via a services network are described. In the system of Reese, access is provided to a services directory which identifies a plurality of services and at least one connector for facilitating consumption of each of the services via the network. Each connector is operable to mediate communication protocol and business policy differences between a first network end point associated with the corresponding service and a second network end point associated with a consumer of the service. For each of selected ones of the connectors, information accessible via the services directory is provided regarding how to use the connector to consume the corresponding service. For each of selected ones of the services, access to a connector design process is provided via the services directory. The connector design process is operable to facilitate creation of a new connector for the corresponding service, and to specify at least one business process for mediating the business policy differences.

In the U.S. Pat. No. 7,788,399, Brouk et al. describe a system and method for enabling the interchange of enterprise data through an open platform. In the system of Brouk et al. the open platform can be based on a standardized interface that enables parties to easily connect to and use the network. Services operating as senders, recipients, and in-transit parties can, therefore, leverage a framework that overlays a public network.

SUMMARY OF THE INVENTION

The present invention is directed to a computer implemented system for organizing content data chronologically. The system preferably operates in a cloud-based networking environment. The system includes a server that is accessible over the internet/Intranet from remote computer devices through a network, such as the internet. Application software runs on the server that is configured to host any number data services, such as e-mail. The application software is configured to directly run an e-mail application or alternatively is configured to interface with an external e-mail application or any other electronic communications application, such as social network applications.

Preferably, the application software is coded for organizing electronic communications data from multiple content sources or users. The application software is configured to organize the electronic communications chronologically into time-lines. The time-lines are viewable from remote computer devices on a single graphical user interface that is preferably an icon-based graphical user interface.

The time-lines represent, for example, a potential business transaction between two business entities. The time-lines are coded with dates that are accessible sub-files. The sub-files contain electronic communications data between the multiple content sources (users) from the entities, which have been transmitted on dates along the time-lines. Preferably, each of the sub-files are coded or configured to be coded for a level of success and numeric indicating a number of transmissions of electronic communication data that have occurred between the multiple content sources (users) on the dates corresponding to each of the sub-files.

In further embodiments of the invention the application software is coded for organizing electronic communications data or sub-files from the time-lines into a folder according to a metric, such as the level of success assigned by a user. The software for organizing electronic communications data or sub-files from the time-lines into a folder according to the metric is preferably operated through a tool feature on the graphical user interface that is operable by the user from remote computer devices.

The application software in yet further embodiments of the invention includes e-mail hosting software. In operation the application software is configured extracted the electronic communications data from the multiple content sources (e-mail accounts) to generate the time-lines based on user identifiers associated business entity or entities and/or transaction identifier that corresponds to the time-line.

The time-lines or portions thereof can be tagged to be accessible by multiple users in a social network environment over the internet, such that some of the electronic communications data is shared by authorized users through remote computer devices.

In accordance with the method of the present invention, transactions from multiple content sources are manages through the graphical user interface by establishing a relationship identity or identifier that defines a time-line. The relationship identity or identifier includes, for example, a name of company and any number of selected content sources, users and/or e-mail accounts corresponding to, or associated with, the name, the relationship identity or the identifier. The server receives electronic communications data from two or more of the content sources and the application software organizing the electronic communications data into sub-files based on dates the electronic communications data was transmitted (sent or received). The application software then displays the sub-files on a time-line corresponding to the name, the relationship identity or the identifier the through the graphical user interface.

As described above, the application software preferably includes tools that allow users to code the sub-files according to a metric, such as a success metric. For example the sub-files are coded with a color to indicates a level of success. The sub-files are also coded with a numeric to indicate a number of communications contained within each sub-file. The graphical user interface also preferably includes tool features that allow users to organizing the sub-files into a folder according to the metric. The server and application software in further embodiments of the invention is configured to store user history analytics based the electronic communications data transmitted and/or remote computer usage.

DETAILED DESCRIPTION OF THE INVENTION

Figure 1:
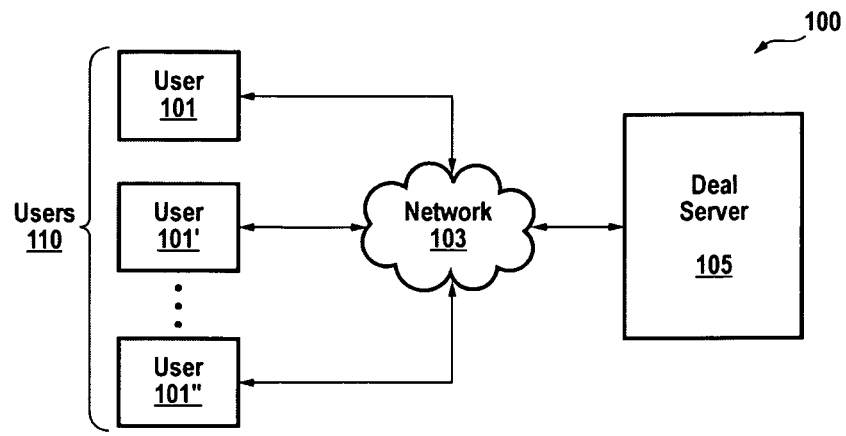
FIG. 1 is a schematic representation of a cloud-based computer system for managing electronic communications data from multiple sources, in accordance with the embodiments of the invention.

FIG. 1 is a schematic representation of a computer implemented system 100 for managing electronic communications data from multiple sources or users 101, 101' and 101", collectively 100. The system 100 preferably operates in a cloud-based networking environment and includes a server 105 that is accessible over the internet/Intranet from remote computer devices through a network 103, such as the internet. Application software runs on the server 105 that is configured to host any number data services, such as e-mail. The application software is configured to directly run an e-mail application or alternatively is configured to interface with an external e-mail application or any other electronic communications application, such as a social network applications.

The application software is coded for organizing electronic communications data from multiple content sources or users 110 chronologically. Electronic communications data includes any data or information that is transmitted between internet/intranet enabled devices. The multiple content sources or users 110 include remote computers and users as well as other servers that operate over the network 103 including, but not limited to, e-mail servers and social network servers.

Figure 2A:
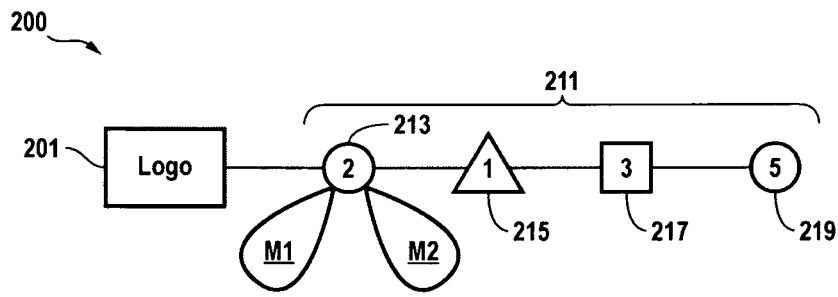
FIG. 2A shows a representation of a time-line with chronologically displayed sub-file containing electronic communications data between the multiple sources entities corresponding to dates of transmission, in accordance with the embodiments of the invention.
Figure 2B:
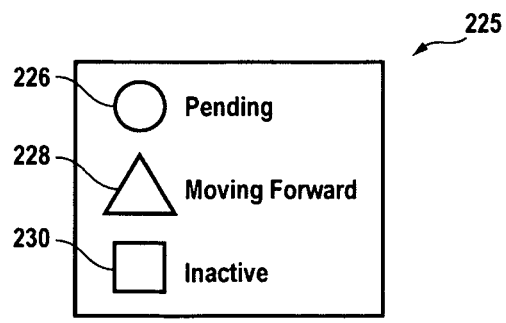
FIG. 2B shows a tool feature for coding and displayed sub-files containing electronic communications data between the multiple sources entities based on a metric, in accordance with the embodiments of the invention.

The application software of the present invention is configured to organize the electronic communications chronologically into time-lines, such as shown in FIG. 2A. The time-lines are viewable from the remote computer devices on a single graphical user interface. The graphical user interface is preferably an icon-based graphical user interface.

Referring to FIG. 2A, a time-line 200 in accordance with the embodiments the invention is displayable and interactive. The time-line 200 of the present invention is preferably chronological display of electronic communications data between multiple content sources or users from two entities that are establishing a relationship. Accordingly, the time-line 200 is preferably labeled with an identifier or name 201 that indicates or identifies an entity that an end user, a hosting company or account owner is attempting to establish a relationship with. The identifier or name 201 is, for example, a company log.

In operation, multiple content sources or users within the two entities transmit and receive electronic communications data through, for example, an e-mail application running on the server 105 or another server. The application software interfaces with the e-mail application and organizes the electronic communications data transmitted into sub-files 213, 215, 217 and 219, collectively 211. The sub-files 211 are chronologically displayed according to the dates of transmission of the electronic communications data.

Each of the sub-files 211 are accessible and configured to be opened from the graphical user interface, such that the electronic communication data contained therein can be reviewed or retrieved. For example, the sub-file 213 contains two transmissions of electronic communication data M1 and M2. The end user, hosting company or account owner of the time-line 200 can select the sub-file 213 and view, copy, resent or edit the transmissions of electronic communication data M1 and M2. Preferably, each of the sub-files is labeled with a numeric indicating the number of transmissions of electronic communication data that have occurred between the multiple content sources (users) on the dates corresponding to each of the sub-files 211. For example, sub-files 217 contains three transmissions of electronic communication data, sub-files 219 contains five transmissions of electronic communication data and so on.

In further embodiments of the invention, the application software host one or more tool features 225. A tool feature is usually represent by an icon, that are viewable and/or selectable from a from a computing device; selecting the tool will generally initiate one or more software sequences to access, display and/or organize electronic communications data on a graphical user interface on a computer devices.

The tool feature 225 allows the end user, hosting company or account owner of the time-line 200 to code the time-line, electronic communications data and or sub-files 211 with a metric. For example, the sub-file 213 is coded with a circle 226 from the tool feature 225, indicating the sub-file 213 is classified as pending, the sub-file 215 is coded with a triangle 228 from the tool feature 225, indicating that the sub-file 215 is moving forward; and the sub-file 217 is coded with a square 230 from the tool feature 225, indicating that the sub-file is inactive. In accordance with further embodiments of the invention, the time-line, electronic communications data and or sub-files 211 are coded for a metric that is indicated by a color, such as described below with reference to FIGS. 3A-B.

Figure 3A:
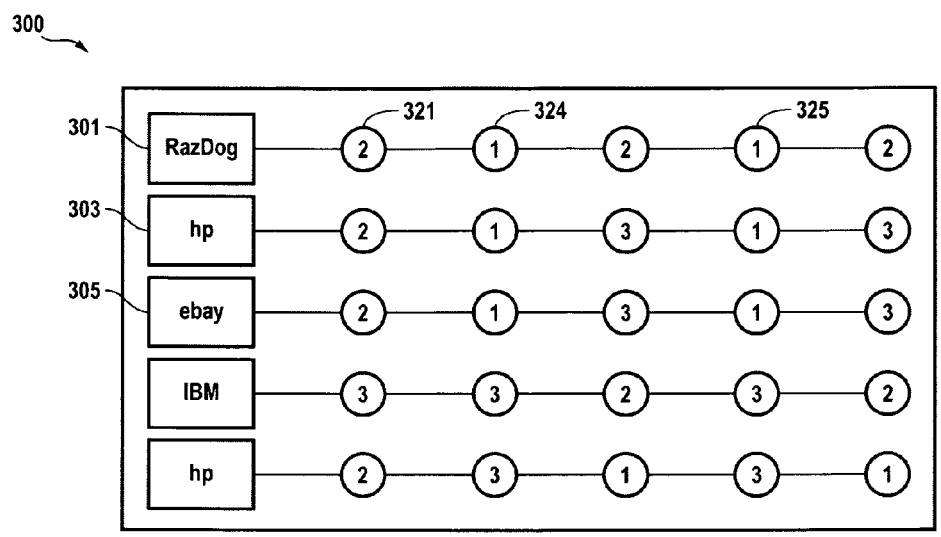
FIG. 3A shows dynamic user page with multiple displayable and interactive time-lines, in accordance with the embodiments of the invention.

FIG. 3A shows dynamic user web-page 300 with multiple displayable and interactive time-lines, 301, 303 and 305. Each of the time-lines 301, 303 and 305 represent a tread of communications data transmitted between two entities from multiple content sources and displayed chronologically, such as described above. The communications data are organized into user accessible sub-files 321, 323 and 325 for communications data transmitted on any given day. The sub-files 321, 323 and 325 preferably have a numeric that indicated the number of communications data transmitted or files transmitted on the day corresponding to the sub-file.

Figure 3B:
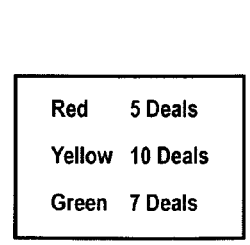
FIG. 3B shows a tool feature for coding and organizing electronic communications data or sub-files from time-lines into a folder based on a metric, in accordance with the embodiments of the invention.

The dynamic user web-page 300 preferably includes a tool 350 feature, such as shown in FIG. 3B. The tool allows a user to code and organize electronic communications data or sub-files from time-lines 301, 303 and 305 into a folder based on a metric. In this example, a tool feature 350 allows a user to code each of the sub-files 321, 323 and 325 by a color. The color is used to code sub-files for a level of perceived success. For example green codes for successful, yellow codes for pending and red codes for inactive. It will be clear to one skilled in the art that the time-lines 301, 303 and 305, sub-files 321, 323 and 325 and the electronic communications data or files can all be coded with any number of different metrics. The tool feature 350, also allows the user to generate one or more folders with sub-files 321, 323 and 325, electronic communications data or files organize according to the assigned metric.

Figure 4:
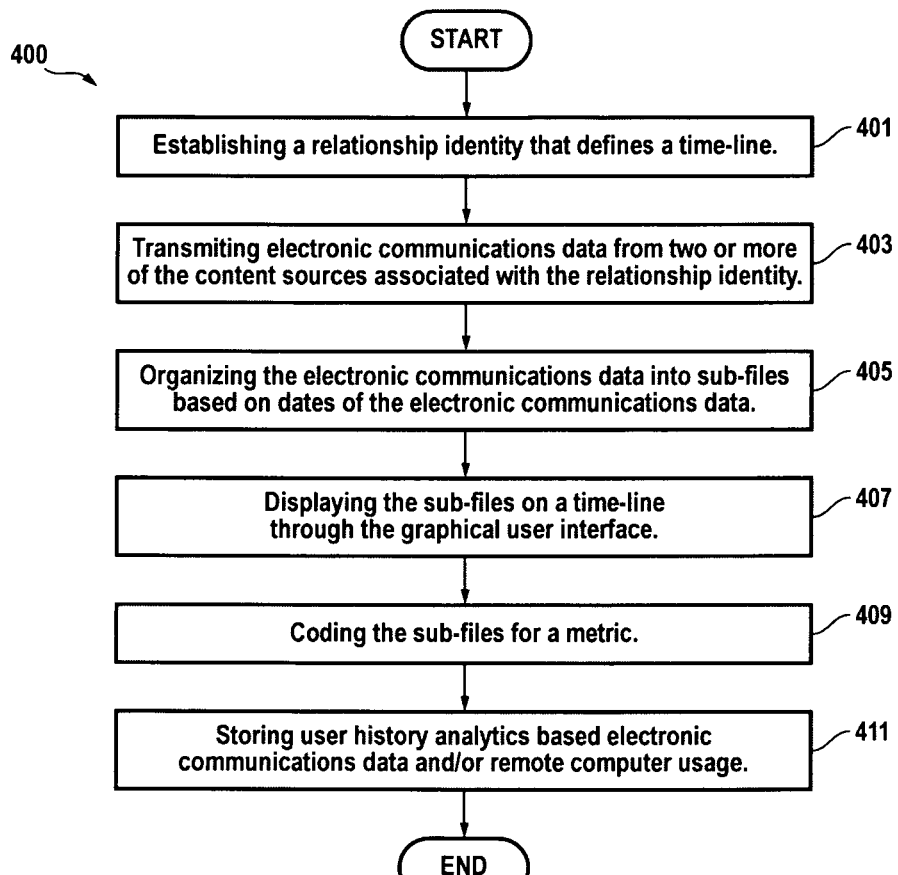
FIG. 4 shows a block-flow diagram outlining steps of a method for managing transactions from multiple content sources through a graphical user interface, in accordance with the embodiments of the invention.

FIG. 4 shows a block-flow diagram 400 outlining steps of a method for managing transactions from multiple content sources through a graphical user interface, such as described above. In operation, a user will generally log into the server 105 (FIG. 1) that runs the application software that interfaces with an electronic communications application, such as e-mail. The user will then establish an account and down-load all of the necessary software and/or tool features required to operate the account for a remote computer. While it is preferably that the computer implemented system of the present invention operates in a cloud-based network environment, it will be clear to one skilled in the art the system of the resent invention can also be configured to be hosted and operated from the desk-top of the user's computer.

Regardless of how the user account is established or where the application software is operating, in the step 401 a user establishes a relationship identity that defines the time-line. The relationship identity is typically between the user and another entity. However, the entities in accordance with alternative embodiments of the invention are external entities, wherein the user is acting as an authorized administrator or manager of the relationship. After the user establishes a relationship identity in the step 401, in the step 403 any number of electronic communications data are transmitted (sent or received) through the account. The electronic communications data transmissions are from any number of content sources (users) associated with the relationship identity. After the communications data are transmitted in the step 403, in the step 405 the electronic communications data are organized into sub-files based on dates of the electronic communications data were transmitted. Preferably the application software of the computer implemented system automatically organizes the electronic communications data into sub-file based on a tag assigned each of the content sources (users) that are associated with the relationship identity. After the electronic communications data are organized into sub-files in the step 405, in the step 407, the sub-files are displayed chronologically on a time-line for each relationship identity, as describe above. After the sub-files are created in the step 405 and displayed in the step 407, the user can code the sub-files with any number of different metrics using tool features, such as described above. Throughout the method for managing transactions from multiple content sources, the application software can be configured to collect and store user history analytics based electronic communications data and/or remote computer usage.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A method of managing transactions from multiple content sources through a graphical user interface, the method comprising:
   a) establishing a relationship identity that identifies a linear time-line using a remote server that is accessible over the internet/Intranet from remote computer devices, wherein the relationship identity also identifies two or more users or entities associated with the linear time-line;
   b) receiving electronic communications data from two or more of the content sources associated with the two or more users or entities using the remote computer devices;
   c) organizing the electronic communications data into sub-files based on dates of the electronic communications data using an application software that runs on the server and includes software coded for organizing the electronic communications data from the two or more of the content sources chronologically onto the linear time-line that is viewable from the remote computer devices, wherein dates on the linear time-line represent an accessible sub-file containing the electronic communications data between the two or more of the content sources corresponding to each of the dates and wherein the each of sub-files are automatically coded or labeled for a level of success or importance based an amount of electronic communications data received; and
   d) displaying the sub-files on the linear time-line through the graphical user interface, wherein each of the sub-files are individually accessible from the linear time-line.

2. The method of claim 1, further comprising coding the sub-files with user selected metrics.

3. The method of claim 2, wherein the coding the sub-files with the user selected metrics comprising assigning colors to the sub-files.

4. The method of claim 3, further comprising organizing the sub-files according to the colors assigned into a folder.

5. The method of claim 1, wherein the user graphical interface is accessible from the remote server through remote computers devices.

6. The method of claim 5, wherein the remote server is an e-mail server.

7. The method of claim 1, wherein the graphical user interface is an icon-base web-page.

8. The method of claim 5, further comprising storing user history analytics based one or more of the electronic communications data and remote computer usage.

9. A method of managing electronic communications, the method comprising:
   a) assigning linear time-lines to users from a remote server that are assessable over the internet/Intranet from remote computer devices, wherein the time-lines identify the users assigned to the time-lines;
   b) receiving the electronic communications from content sources associated with the users from the remote computer devices;
   c) organizing the electronic communications into sub-files based on dates that the electronic communications are received using an application software that runs on the server and includes software coded for organizing the electronic communications data from the two or more of the content sources chronologically onto the linear time-line that is viewable from the remote computer devices, wherein dates on the linear time-line represent an accessible sub-file containing the electronic communications data between the two or more of the content sources corresponding to each of the dates and wherein the each of sub-files are automatically coded or labeled for a level of success or importance based an amount of electronic communications data received; and d) displaying the sub-files on the linear time-lines assigned to the users through the graphical user interface, wherein each of the sub-files are independently accessible on the time-lines through the graphical user interface.

10. The method of claim 9, wherein the sub-files are automatically coded or labeled to indicate a number electronic communications received on the dates corresponding to the sub-files.

11. The method of claim 9, further comprising coding or labeling the sub-files with user selected metrics that indicate levels of importance of each of the sub-files.

12. The method of claim 11, further comprising organizing the sub-files into electronic folders according the user selected metrics.

\* \* \* \* \*